Aug. 2, 1932.    F. A. BYLES    1,870,092
POWER SYSTEM
Original Filed Jan. 28, 1928
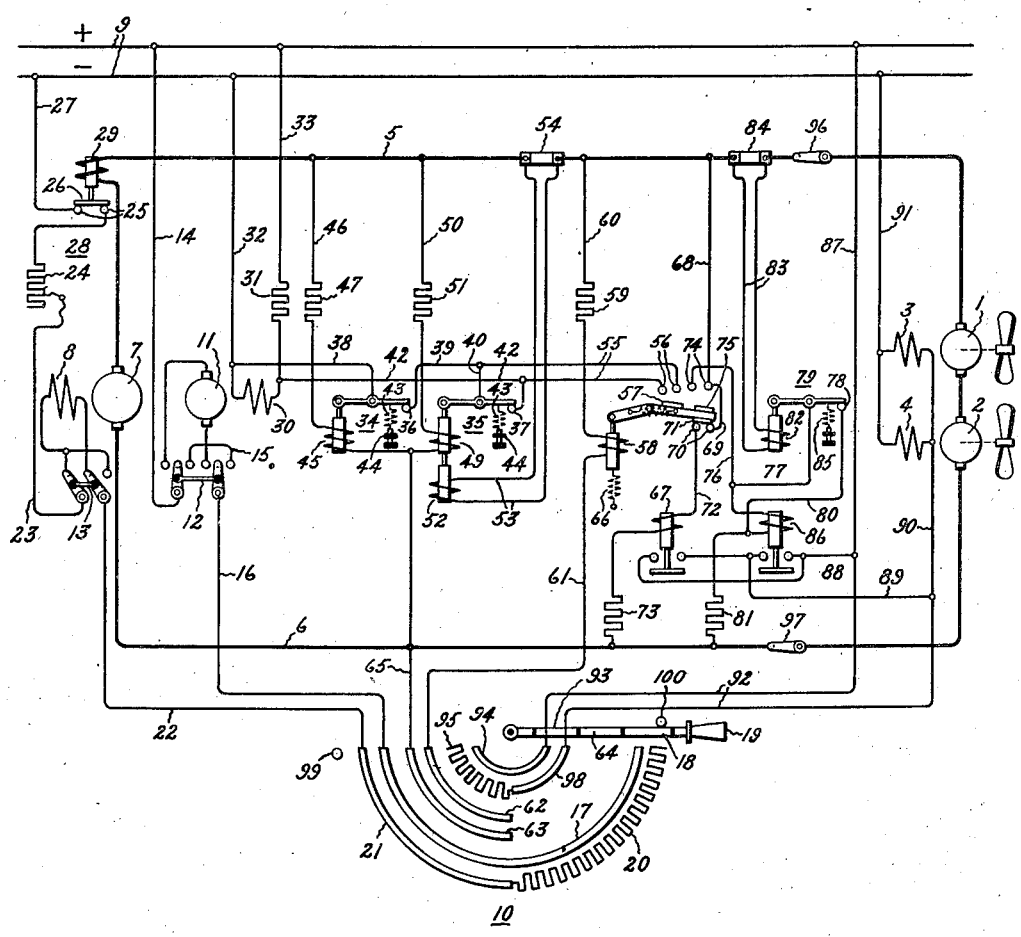
Inventor:
Frank A. Byles,
by Charles E. Tullar
His Attorney.

Patented Aug. 2, 1932

1,870,092

UNITED STATES PATENT OFFICE

FRANK A. BYLES, OF SCHENECTADY, NEW YORK, ASSIGNOR TO GENERAL ELECTRIC COMPANY, A CORPORATION OF NEW YORK

POWER SYSTEM

Original application filed January 28, 1928, Serial No. 250,251. Divided and this application filed June 6, 1930. Serial No. 459,439.

My invention relates to power systems, and more particularly to ship propulsion systems wherein a propeller is driven by a motor or motors supplied with current from one or more generators, driven by prime movers such as Diesel engines or steam turbines, and wherein means are provided for enabling the system to deliver full power at all times (which is especially desirable during maneuvering) while at the same time preventing injury to the apparatus under abnormal conditions of operation.

An object of my invention is to provide a system wherein automatic regulators are associated with a control mechanism in a manner to accomplish the above results.

A further object of my invention is to provide a system including voltage regulating means and power limiting regulating means accumulatively responsive to voltage and current interconnected with one another in such a manner as to limit the starting current to a certain value which tapers off as the voltage rises and thereafter to hold constant voltage. This forms the subject matter of my parent application, Serial No. 250,251, filed January 28, 1928, for Power systems.

A further object of my invention is to provide means for controlling the motor field or fields in response to motor current irrespective of the control exercised by the controlling means so as to obtain full power at all times without overloading the generating apparatus.

A further object of my invention is to provide means for transferring the control from the power limiting regulating means to the means for controlling the motor field or fields in response to motor current when the voltage of the system has attained a predetermined value and the control mechanism is operated to motor controlling position.

A further object of my invention is to provide a power system which may be controlled in a simple, reliable and efficient manner.

My invention and additional objects thereof will be better understood from the following description taken in connection with the accompanying drawing and its scope will be pointed out in the appended claims.

The single figure of the drawing diagrammatically illustrates a system embodying the features of my invention.

The drawing shows two propeller motors 1 and 2 provided with separately excited fields 3 and 4 and connected through conductors 5 and 6 to a generator 7 driven by any suitable prime mover such as a Diesel engine (not shown). The generator 7 is provided with a separately excited field winding 8 arranged to be energized from a suitable source of direct current 9 through a controller 10 and a counter E. M. F. regulator machine 11. The counter E. M. F. machine has not been illustrated in detail in the drawing since such machines are well known in the art and the particular form of regulator employed for controlling the generator field is not important. The counter E. M. F. machine may be of the motor type or of the generator type and may or may not be included in the generator field circuit depending on the position of a switch 12, which may also operate to disconnect the field 8 from the source 9 although the controller 10 in its off position will also serve this purpose. The generator field may be reversed by means of a switch 13 and its intensity controlled by means of the controller 10 and the effect of the counter E. M. F. machine 11. The field circuit is completed as follows: From the plus side of the source 9, through conductor 14, switch 12, counter E. M. F. machine 11 or conductor 15, conductor 16, segment 17, contact 18 on arm 19 of controller 10, resistance 20, and/or segment 21, conductor 22, switch 13, field 8, conductor 23, adjustable resistance 24, contacts 25, contact member 26, and conductor 27 to the negative side of the source of supply 9. The contacts 25 and contact member 26 are parts of an overload relay 28 whose operating coil 29 is inserted in the load circuit between the motors 1 and 2 and the generator 7 to protect the system from overloads which may occur if for any reason the protective apparatus and regulating means about to be described fail to operate or to accomplish the purposes for which they are designed. As is well understood by those skilled in the art to which the present invention applies, suitable discharge resistances may be associated with the field circuit at the relay 28 and the switches 12 and 13 to protect the field winding 8 from the effects of the inductive discharge occurring upon opening its circuit when the same is carrying current. Since such arrangements are already well known to the art, and since they form no part of the present invention, the present drawing has not been complicated by their addition.

The counter E. M. F. machine 11 is provided with a field winding 30 which is connected to the source 9 through a resistance 31 and conductors 32 and 33. The degree of energization of the field 30 is controlled by a voltage regulator 34 and a power limiting regulator 35 whose contacts 36 and 37 are connected in series by conductors 38, 39, 40, 41 and 42 across the field winding 30. The arrangement is such that when both contacts 36 and 37 are closed the field winding 30 is short circuited and consequently substantially deenergized. The contacts 36 and 37 of the regulators are normally biased to closed positions by springs 43, the tension of which may be varied by suitable means illustrated at 44. The operating coil 45 of the voltage regulator 34 is connected across the generator 7 through conductors 5 and 46, resistor 47, and conductors 48 and 6. The voltage coil 49 of the power limiting regulator 35 is connected across the generator 7 through conductors 5 and 50, resistance 51 and conductors 48 and 6. The current coil 52 of the power limiting regulator 35 is connected by conductors 53 to a shunt 54 inserted in the power line 5 between the motors 1 and 2 and the generator 7. The coils 49 and 52 of the power regulator are connected accumulatively so that as the voltage rises the regulator responds to less and less current. The regulators 34 and 35 may be adjusted by suitably tensioning the springs 43 by means 44 and the energization of the coils 45, 49 and 52 by suitably adjusting the resistances 47 and 51 and suitably selecting or adjusting the shunt 54.

The contacts 37 of regulator 35 may be short circuited through conductors 55, contacts 56 and contact member 57 when relay 58 is suitably energized. This relay is connected across the generator 7 through a resistor 59 by conductors 60 and 61, segments 62 and 63 of controller 10, contact 64 upon the operating handle 19 of controller 10 and conductor 65. Relay 58 is held in its deenergized position by a spring 66 and in this position completes the circuit of contactor 67 as follows: Through conductors 68 and 69, contacts 70, contact member 71, conductor 72, and resistance 73. When relay 58 is in its energized position; that is, in a position in which it short circuits the contact 37 of power limiting relay 35, a circuit is likewise completed through contacts 74 by contact member 75 through conductor 68, contacts 74, contact member 75, conductors 76 and 77, contacts 78 of a current regulator 79, conductor 80 and resistor 81. Relay 58 is so designed that it will not stick in a mid position between the contacts 56 and 74 and the contacts 70 but will occupy either one or the other of these positions. This result may be accomplished by the use of a spring toggle construction such as diagrammatically illustrated in the drawing.

The current regulator 79 is provided with a winding 82 which is connected through conductors 83 to a shunt 84 inserted in the power line between motors 1 and 2 and generator 7. This regulator is normally biased to a closed position as illustrated by a spring 85 in which position the contacts 78 previously referred to are closed. When, however, the regulator is sufficiently energized the contacts 78 are opened against the force of the spring 85 and the circuit completed through the contactor 86 as follows: conductors 5 and 68, contacts 74, contact member 75 of relay 58, conductor 76, contactor 86, resistor 81 and conductor 6. When either contactor 67 or 86 is energized the fields 3 and 4 of the motors 1 and 2 are connected directly across the source of supply 9, through conductors 87, 88, 89, 90 and 91. When the contactors 67 and 86 are deenergized the energization of the fields 3 and 4 of motors 1 and 2 may be controlled by operating the handle 19 of the controller 10, which in its final positions completes the circuit of the fields 3 and 4 through conductors 92, contact 93 on handle 19 of controller 10, and segment 94 and resistance 95 of controller 10. For the purpose of testing the equipment without operating the ship, switches 96 and 97 are provided in conductors 5 and 6 for disconnecting the motor armatures from the generator 7.

While the generator voltage is below its normal operating value and is being controlled through the agency of resistance 20 in the controller 10, full field is maintained on the motors 1 and 2 by completing their circuit directly across the source of supply 9 through contact 93 and segments 94 and 98 of controller 10, the circuit being as follows: conductors 87 and 92, segment 94, contact 93, segment 98, conductors 92 and 90, motor fields 3 and 4 and conductor 91.

Assuming that when switch 13 is in the position illustrated the generator voltage applied to the motors is in such a direction as to cause the proper rotation of the propellers to propel the boat in a forward direction; that switches 96 and 97 are closed and that switch 12 is thrown to the left to include the counter E. M. F. machine 11 in the field circuit 8 of the generator 7, the operation of the system as the controller handle 19 is moved to the left is as follows. In the initial operating position contact 18 on the handle 19 of controller 10 completes the field circuit of generator 7 through segment 17 and resistance 20 of the controller, the circuit being as follows: From the plus side of the source of supply 9, through conductor 14, switch 12, counter E. M. F. machine 11, conductor 16, segment 17, resistance 20, segment 21, conductor 22, switch 13, field 8 of generator 7, conductor 23, adjustable resistance 24, contacts 25, contact member 26, and conductor 27 to the negative side of the source of supply 9. Depending upon operating conditions and the position of the control handle 19 a greater or less amount of current will flow between the generator 7 and motors 1 and 2. Regulator 35, which is responsive to this current flow as well as to the voltage of the generator 7, will operate in a manner to control the effect of the counter E. M. F. machine 11 so as to limit the starting current to a predetermined value and thereafter taper off the load current as the generator voltage rises this action resulting from the fact that the voltage and current coils of the regulator are connected accumulatively. As the control handle 19 is moved further and further to the left the resistance 20 is removed from the field circuit of the generator until finally the contact 18 bridges the segments 17 and 21. Thereafter the voltage of the generator 7 will depend upon the speed of rotation of the prime mover, the adjustment of the resistance 24 and the controlling effect exercised by the voltage regulator 34 acting through the counter E. M. F. machine 11.

Just previous to, or at the same time that the contact 18 on the handle 19 of controller 10 engages segment 21, contact 64 on the handle of the controller completes through segments 62 and 63 a circuit through the transfer relay 58 which is as follows: Conductors 5 and 60, resistance 59, relay 58, conductor 61, segment 62, contact 64, segment 63 and conductors 65 and 6. As has been previously stated, the adjustment of the transfer relay 58 is such that when the generator voltage attains a predetermined value it moves its contacts from the lower position illustrated in the drawing to an upper position. In this upper position the relay contact member 57 short circuits the contacts 37 of power limiting regulator 35 and completes a circuit through contacts 78 of current regulator 79 at contacts 74 by its contact member 75, thereby transferring the control previously exercised by the power limiting regulator 35 to the current regulator 79. Thereafter the voltage regulator 34 will operate in a manner to maintain constant voltage on the generator 7 while the current regulator 79 will operate in a manner to short out any resistance 95 that may have been included in series with fields 3 and 4 between the motors 1 and 2 when the current flowing between generator 7 and motors 1 and 2 attains a predetermined value. This result is accomplished through the agency of contactor 86 which when energized completes a circuit through conductors 88 and 89 shunting the circuit including the resistance 95 of the controller 10 and connecting the fields 3 and 4 directly across the source of supply 9 as follows: Through conductors 87, 88, 89, and 90, fields 3 and 4, and conductor 91. The operating coil of the contactor 86 may be shorted by conductors 77 and 80 and the contacts 78 of current regulator 79. When, however, the operating coil 82 of the current regulator 79 is sufficiently energized this circuit is open at the contacts 78 and the coil 86 energized by generator voltage through the following circuit: Conductor 68, contacts 74, contact member 75 of relay 58, conductor 76 and resistance 81.

The final position of the control handle 19 is determined by a stop 99 and the off position of this handle is limited by a stop 100.

During starting it is desirable to maintain full field on the motors 1 and 2 and if the operator should rapidly advance the handle 19 of the controller 10 illustrated in the drawing through more than 90 degrees it is apparent that a portion of the resistance 95 of the controller 10 will be included in the motor field circuit if the circuit were completed through the controller. However, it is to be noted that this is not the case since until the relay 58 operates, which is responsive to generator voltage, a circuit is completed through conductors 68 and 69, contacts 70, contact member 71, the operating coil of contactor 67 and resistance 73. The contactor 67 will thus be operated and complete the field circuit of the motors 1 and 2 through conductors 88 and 89 directly across the source of supply 9. The circuit is as follows: Conductors 87 and 88, contacts of contactor 67, conductors 89 and 90, fields 3 and 4 of the motors 1 and 2 and conductor 91. Thus, independently of the position of the control handle 19, full field will be maintained upon the motors 1 and 2 until the generator voltage has attained a predetermined value which may be within a few per cent of full load value.

It is also to be noted that if the handle 19 is rapidly advanced to the left through more than 90 degrees, referring of course to the illustrated embodiment, the effect of the resistance 20 in the field circuit will not be such as to limit the current flowing between the generator 7 and the motors 1 and 2 below a safe operating value. However, the power limiting regulator 35 will function through the agency of the counter E. M. F. machine 11 to maintain the power limit below that which the prime mover can safely carry. The regulator or current responsive means 79 likewise operates to limit the power demanded by the motors for when the load current attains a predetermined value the regulator operates in a manner to increase the field strength of the motors which then slow down and shed part of their load. In the particular case of ship propulsion the power demand decreases approximately as the cube of the speed. If the prime mover is a Diesel engine it is quite imperative that severe overloads be eliminated as such overloads are very apt to cause damage to the engine. At the same time, however, from an electrical point of view it is desirable to always have full field on the motors during maneuvering and to supply the greatest amount of energy possible from the generator. The arrangement just described will accomplish this result. Eventually, during the operation of the system, the regulator 34 operates in a manner to maintain constant voltage on the generator 7.

The purpose of the transfer relay 58, other than maintaining full field on the motors during starting, is also as its name implies to transfer automatic control from the power limiting regulator 35 to the current regulator 79. If some such transfer arrangement were not provided, and if both the power limiting regulator 35 and the current regulator 79 were operated at the same time, there is a possibility that due to the lag of the generator field 8 in responding to the control exercised by regulator 35 the regulators 35 and 79 might continue to operate in a manner to reduce the generator voltage to a very low value. This may be understood by considering the following operation. Assume that an excessive current is flowing between the generator 7 and motors 1 and 2. This will cause regulator 35 to operate due to the action of the coil 52 of this regulator. The regulator then will through contacts 37 operate upon the field 30 of the counter E. M. F. machine 11 to reduce the generator voltage and in this manner to reduce the current flowing between the generator 7 and the motors 1 and 2. If, however, the current regulator 79 is also in circuit and if the control handle 19 is in a position to include a portion of the resistance 95 in the field circuits 3 and 4 of motors 1 and 2, it may likewise operate in a manner to increase the field strength of the motors. Thereafter when the current has decreased sufficiently it is possible that the current regulator 79 may operate before the power limiting regulator 35. If this happens the fields of motors 1 and 2 will be weakened and more current will flow between the generator and the motor, which current may be sufficient to again operate the power limiting regulator 35 which will then further decrease the voltage of generator 7. This action may continue until the generator voltage 7 is reduced to a very low value as has been stated above.

Under severe conditions of operation when the regulating apparatus just described is not adequate to protect the system from severe overloads, the relay 28 whose operating coil 29 is inserted in the load circuit will function in a manner to relieve or remove the load on the system by deenergizing completely or partially the field 8 of the generator 7. The same protection may also be secured by placing an overload circuit breaker in the armature circuit of the generator and motors.

If for any reason one of the motors 1 or 2 should become incapacitated it is possible to short circuit this motor and by readjusting the regulators and the resistance 24 in the field circuit 8 of the generator 7 the system illustrated can still operate with one motor. It is, of course, apparent that the motors 1 and 2 might be placed in parallel in which case the above adjustments would not have to be resorted to since the defective motor could be cut out of circuit without effecting the operation of the other motor. In such a case however shunts 54 and 84 may have to be adjusted to limit the load current to a value suitable for one motor.

The controller illustrated in the drawing may be placed in the engine room or in the pilot house and as is well known a suitable arrangement may be had wherein a controller, similar to that shown, is located in both the pilot house and the engine room or the controller may be operated from the pilot house by chains or wires. Instead of having the hand controller located in the pilot house a dial switch and push button station may be used to control a motor driven rheostat similar to the hand rheostat shown in the drawing. Since, however, these features are well known to those skilled in the art and form no part of the present invention such arrangements have not been specifically illustrated.

If for any reason the automatic regulating apparatus should fail to function properly the counter E. M. F. machine 11 may be removed from the circuit by throwing the switch 12 to the right and thus completing the field circuit through the conductor 15. With this arrangement it is possible to control the vessel independently of any regulating action secured through the action of the counter E. M. F. regulator.

It is apparent to those skilled in the art that the proposed arrangement may be modified to meet varying requirements without departing from my invention which has been shown and described in connection with a simplified arrangement for the purpose of clearly illustrating the invention and I, therefore, aim in the appended claims to cover all such changes and modifications as fall within the true spirit and scope of my invention.

What I claim as new and desire to secure by Letters Patent of the United States is:

1. A generator, a motor, means for successively controlling said generator and said motor, regulating means for limiting the generator control to motor control for maintaining full field on said motor until the voltage of said generator attains a predetermined value and for thereafter rendering said current controlling device operative.

11. A generator, a motor, means for successively controlling said generator and said motor, regulating means for limiting the power delivered by said generator, means for changing an operating characteristic of said motor for limiting the power demanded by said motor, and means depending on the voltage of said generator when the controlling means is operating on said motor for transferring the control from said power regulating means to said motor characteristic changing means.

In witness whereof, I have hereunto set my hand this 5th day of June, 1930.

FRANK A. BYLES.

power delivered by said generator, means for limiting the current demanded by said motor, and means depending on the voltage of said generator when the controlling means is operating on said motor for transferring the control from said power regulating means to said power limiting means.

2. A generator, a motor, means for successively controlling the field of said generator and the field of said motor, regulating means independent of said controlling means for limiting the power output of said generator, means responsive to current operative only during the period of motor field control for strengthening the motor field when the motor current exceeds a predetermined value, and means depending on the generator voltage for shifting the control from said power limiting means to said current responsive means.

3. A power system including a generator, a motor, means for controlling said generator and said motor, regulating means independent of said controlling means for limiting the starting current of said generator and for tapering off said limit as the voltage rises, means for holding constant voltage after the generator voltage has attained normal value, current responsive means operative only during the period of motor control for strengthening the field of said motor when the motor current exceeds a predetermined value, and means for transferring the control from said regulating means to said current responsive means when the controller is operating on the motor and the generator voltage has attained a predetermined value.

4. A ship propulsion system comprising a generator, a motor, means for successively controlling said generator and said motor, regulating means for limiting the power delivered by said generator, means responsive to a predetermined value of motor current for increasing the field excitation of said motor, and means depending on the voltage of said generator when the controlling means is operating on said motor for transferring the control from said power regulating means to said current responsive means.

5. A generator, a motor, means for successively controlling the fields of said generator and said motor, and means responsive to motor current operative only during the period of motor field control when the generator voltage has reached a predetermined value for strengthening the motor field when the motor current exceeds a predetermined value.

6. A ship propulsion system wherein a propeller motor is arranged to be supplied with power from a direct current generator comprising a single manually operated means for controlling the operation of said system by successively controlling the generator and motor fields, means responsive to a predetermined current for strengthening the field of the propeller motor independently of the control exercised by said manual means, and means energized upon the transition from generator control to motor control for rendering said current controlling device operative.

7. A ship propulsion system wherein a propeller motor is supplied with power from a direct current generator, means for manually controlling the fields of said generator and said motor, a counter E. M. F. regulator in series with the field of said generator, means responsive to generator voltage and current for regulating independently of said controlling means the voltage of said counter E. M. F. regulator in a manner to control the voltage and power limit of said generator, means responsive to motor current for strengthening the motor field on overload independently of said controlling means and means for transferring the control from said power regulating means to said current responsive means when the voltage of the generator attains a given value and the controller is operating on the field of said motor.

8. A generator, a motor, means for successively controlling the fields of said generator and said motor, regulating means, independent of said controlling means, responsive to the voltage and load of said generator for controlling the field strength of said generator in a manner to protect said generator from excessive voltage or load, current responsive means for controlling the field energization of said motor independently of said controlling means and means responsive to generator voltage for transferring the control exercised by said power regulator to said current responsive means when the voltage of the generator attains a predetermined value.

9. A generator, a motor, means for successively controlling the fields of said generator and said motor, regulating means for limiting the power delivered by said generator, means responsive to a predetermined load current for strengthening the field of said motor, and means responsive to generator voltage for maintaining full field on the motor until the generator voltage attains a predetermined value and for then transferring control from said regulating means to said current responsive means.

10. A ship propulsion system wherein a propeller motor is arranged to be supplied with power from a direct current generator including a single manually operated means for controlling the operation of said system by manually controlling the generator and motor fields, means responsive to a predetermined load current for strengthening the field of said propeller motor independently of the control exercised by said manual means, and means responsive to generator voltage energized upon the transition from